No. 677,700. Patented July 2, 1901.
A. L. RICH.
COFFEE POT.
(Application filed Nov. 2, 1900.)
(No Model.)
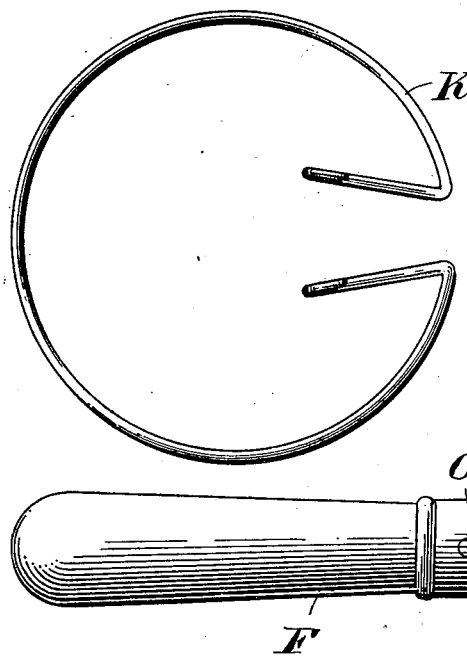
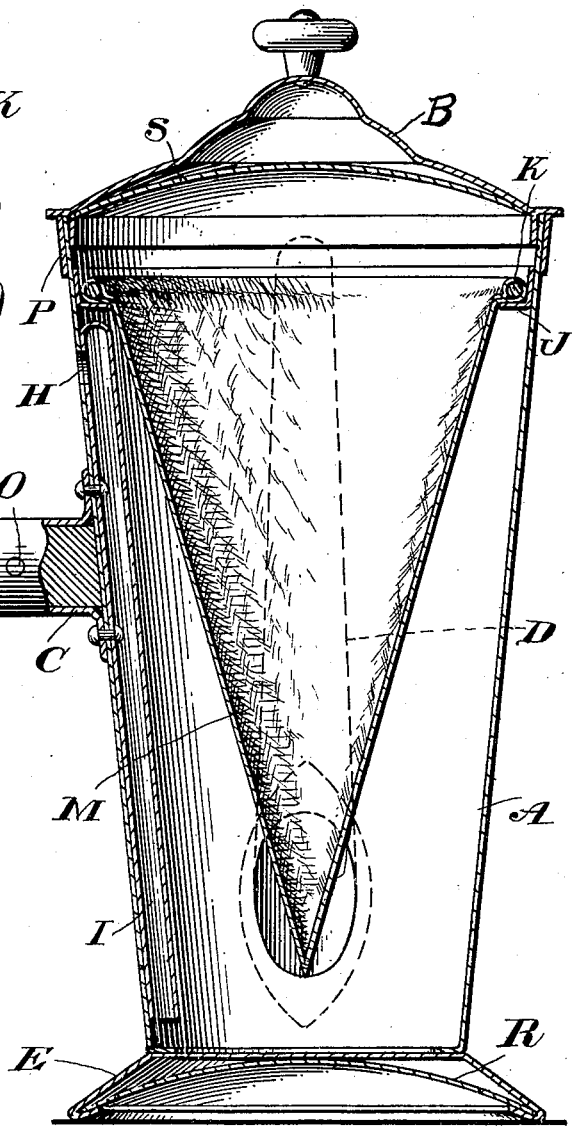
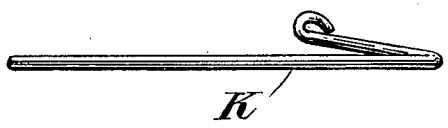
Witnesses
John Maufein.
Rosann S. Smith
Inventor
Abraham L. Rich.

UNITED STATES PATENT OFFICE.

ABRAHAM L. RICH, OF SALT LAKE CITY, UTAH.

COFFEE-POT.

SPECIFICATION forming part of Letters Patent No. 677,700, dated July 2, 1901.

Application filed November 2, 1900. Serial No. 35,273. (No model.)

*To all whom it may concern:*

Be it known that I, ABRAHAM L. RICH, a citizen of the United States, residing at Salt Lake City, in the county of Salt Lake and State of Utah, have invented certain new and useful Improvements in Coffee-Pots; and I do hereby declare the following to be a full, clear, and exact description of the invention, such as will enable others skilled in the art to which it appertains to make and use the same.

My invention relates to an improvement in coffee-pots, and has for its objects economy, the avoidance of all complicated parts or valves which wear out or need replacing, and in which a superior grade of coffee can be made.

My invention consists in the arrangement and construction of parts, which will be more fully described hereinafter.

In the accompanying drawings, Figure 1 is a vertical section of a coffee-pot which embodies my invention. Figs. 2 and 3 are detail views of the spring-wire.

A represents the body of the coffee-pot, which is preferably made of sheet metal heavily tinned inside and which tapers from top toward the bottom, so that the coffee-pot is smallest at this point. The coffee-pot being made vase-shaped or smallest at its bottom is an important factor in the making of fine coffee. This shape also enables the pot to be cleansed easier than those of the same size at both top or bottom or where they are made largest at the bottom. Being vase-shaped, the strength of the coffee is extracted to a much greater degree and more quickly than any other coffee-pot yet devised.

The stand or pedestal E is secured to the bottom of the pot A, so as to give the pot a solid firm foundation or support, and inside of this base or pedestal is secured a false bottom R, which acts as a brace to strengthen the pedestal. This false bottom is formed of a sheet-metal disk which is wedged into the pedestal, and when the lower edge of the latter is turned inwardly it is retained in place and serves to prevent dinging or flattening of the periphery of the pedestal. The spout or outlet D extends from the bottom of the pot and tapers gradually to its outer end.

The handle F is preferably made straight and extends directly outward from the side of the pot and at right angles to the spout D instead of being placed upon the opposite side of the pot in the usual manner. The inner end of this handle F is secured in position by means of the collar or socket C, which extends from the side of the pot A, the collar or socket being in turn fastened by means of the rivet O. The handle extending directly outward from the side of the pot and at right angles to the spout enables the coffee to be poured more easily than can be done where the handle is applied to the opposite side of the pot from the spout in the usual manner.
The upper edge of the pot A is braced or strengthened by the metallic ring or collar P, which extends downward any suitable distance, and this ring or collar prevents the upper edge of the pot from being injured.
The upper end of the pot is closed by means of the top B, which has a flange extending from its bottom to fit tightly inside of the upper edge of the pot in the usual manner, and thus prevents the escape of all aroma at this point. Inside of the cover B is placed the false bottom S, which acts as a brace to strengthen the cover. This false bottom is formed of a sheet-metal disk which is wedged in the cover and serves to maintain it in its circular shape, so that it will not be liable to become flattened on its outer periphery by rough usage, and thus impair its snug fit within the coffee-pot. By this construction a dead-air space is also formed between the false bottom S and the cover B, which greatly serves to prevent the cover becoming heated.

Secured within the pot near its top is the flanged ring J, and upon this flange the wire K is supported, and to this wire the flannel bag M to hold the ground coffee is attached. This flannel bag is made conical in shape and extends to or nearly to the bottom of the pot A and should be made partially of wool, so that it filters and clarifies the coffee without the addition of any foreign substance, and does it instantly, thereby saving time.

Secured to the inner side of the pot A, preferably directly opposite the point where the handle is attached, is an air-tube I, which extends from near the bottom of the pot up within a very short distance of the flange J, and at the top of this tube there is made an opening H through the side of the pot for the admission of air. This tube is open at its lower end, but closed at its upper one, with the exception of where it makes connection with the opening H. As the lower end of this tube extends down below the level of the coffee, no aroma or flavor can escape. Air is admitted gradually through the tube, which acts as a vent for the pot and also prevents heat being conveyed to the handle, as the latter is secured to the side of the pot opposite the tube.

A wire ring from which the flannel bag M is suspended is bent almost into a complete circle and its ends are turned inwardly and upwardly, so as to form handles by means of which the wire can be contracted upon taking hold of it, so as to readily remove the bag. This wire is also contracted by the pressure of the fingers being placed into position, and as soon as it is released it springs outwardly again to its normal shape.

Having thus described my invention, I claim—

1. The combination of a coffee-pot made with downwardly-tapering sides and provided with an opening near its top, an interior air-tube communicating with the opening and extending downwardly to the bottom, a handle located opposite the tube and extending outwardly at right angles to the pot, a flanged ring secured to the interior of the pot and a filter supported by said ring, substantially as described.

2. The combination of a coffee-pot made with downwardly-tapering sides and provided with an opening near its top, an interior air-tube communicating with said opening and terminating near the bottom, a spout, a handle secured to the side of the pot opposite the air-tube and projecting outwardly at right angles to the spout and the pot, a flanged ring secured to the interior of the pot, a filter supported from said ring and provided with a retaining-spring having its ends bent inwardly and upwardly to form handles, said spring adapted to be retained on the flanged ring and support the filter, substantially as described.

3. The combination of a coffee-pot made with downwardly-tapering sides and provided with an opening near its top, an interior air-tube communicating with said opening and terminating near the bottom of the pot, a spout, a handle secured to the side of the pot opposite the air-tube and projecting outwardly at right angles to the spout and the top, a filter supported within the pot, a retaining-spring having its ends bent inwardly and upwardly and retaining the filter in position within the pot, a pedestal provided with a false bottom, and a cover having a disk-shaped spring placed therein to maintain the same in its normal shape.

In testimony whereof I affix my signature in presence of two witnesses.

ABRAHAM L. RICH.

Witnesses:
   FREDERICK J. HILL,
   MARITTA BURNHAM.